United States Patent [19]

Linnéusson

[11] Patent Number: 4,923,156
[45] Date of Patent: May 8, 1990

[54] STAND

[76] Inventor: Ruben Linnéusson, Skånegatan 7, 441 57 Alingsås, Sweden

[21] Appl. No.: 306,502

[22] Filed: Feb. 3, 1989

[51] Int. Cl.$^5$ .............................................. F16M 11/38
[52] U.S. Cl. ................................... 248/170; 248/188.6
[58] Field of Search ............... 248/168, 169, 170, 171, 248/150, 188.6

[56] References Cited

U.S. PATENT DOCUMENTS

| 335,774 | 2/1886 | Richardson | 248/170 |
|---|---|---|---|
| 617,611 | 1/1899 | Strickland | 248/170 X |
| 1,185,607 | 5/1916 | Templin | 248/170 X |
| 1,593,415 | 7/1926 | Perkins | 248/170 |
| 1,721,690 | 7/1929 | Daniele | 248/170 |
| 3,480,250 | 11/1969 | Hankins | 248/170 X |

FOREIGN PATENT DOCUMENTS

| 1064726 | 9/1959 | Fed. Rep. of Germany . | |
|---|---|---|---|
| 325873 | 1/1958 | Switzerland | 248/170 |

*Primary Examiner*—David L. Talbott
*Attorney, Agent, or Firm*—Balogh, Osann, Kramer, Dvorak, Genova & Traub

[57] ABSTRACT

The present invention relates to a stand comprising a central supporting upright (2) and supporting legs (3) distributed around same, which supporting legs are mounted on the central supporting upright (2) in such a way as to be capable of being pivoted between a collapsed stowage position (I) and an unfolded supporting position (II), with the supporting legs (3) extending essentially along said central upright (2) and at an angle outwards from the central upright (2) for the purpose of erecting the stand (1) on a base. A lock (6) is provided for locking the legs (3) in the unfolded supporting position.

A leg locking means (6) which supports the ends (7) of the locking legs situated closest to the central upright (2) is capable of being displaced along the central upright (2) between a stowage position maintained at a certain distance from the bearings (4) for the supporting legs and a supporting position maintained at a certain distance from the bearings for the supporting legs between a stop and said supporting leg ends (7).

Simple locking is achieved, at the same time as which the stand (1) is easy to handle and occupies little space in the collapsed position.

9 Claims, 4 Drawing Sheets

STAND

The present invention relates to a stand comprising a central supporting upright and supporting legs distributed around same, which supporting legs are mounted on the central supporting upright in such a way as to be capable of being pivoted between a collapsed stowage position and an unfolded supporting position, with the supporting legs extending essentially along said central upright and at an angle outwards from the central upright for the purpose of erecting a stand on a base, with a locking means being provided for locking the legs in the unfolded supporting position.

German Patent Specification DE 1 064 726 illustrates an embodiment of a collapsible stand consisting of three legs pivotally mounted around a stand centre part, which legs are so arranged as to be locked in the unfolded position and in the folded position by means of a stop ring. This stop ring exhibits three tongues which are capable of being introduced into spaces between the central tube of the stand and a main leg articulation. Said previously disclosed construction calls for the accurate fitting of the tongues in conjunction with the locking of the legs.

The principal object of the present invention is, first and foremost, to make available a stand comprising legs which can be collapsed to form a compact unit, and a locking means which permits the simple and safe locking of the legs in the unfolded supporting position.

Said object is achieved by means of a stand in accordance with the present invention.

The stand in accordance with the present invention comprises a leg lock in the form of a ring which is so arranged as to be capable of being accommodated in such a way that, in the supporting position II for the legs 3, it rests on a leg supporting part 8, 13 so that the inner ends 7 of the supporting legs rest against the upper side of said leg locking ring 6 with the supporting legs 3 capable of pivoting freely in a direction downwards from their outward-pivoted supporting position (II). Said stand, unlike the aforementioned previously disclosed stand, permits amongst other things the following advantages to be achieved:

(A) With the stand unfolded, the legs adopt a small angle to the floor, producing a considerable saving in space and enabling one to pass over the legs. This is very important.

(B) The execution of the locking ring means that it does not have to be adjusted when unfolding the stand or raising the locking ring from the collapsed position.

(C) The construction of the legs is the simplest possible; all that is required, for instance, is for holes to be made in simple legs, for example tubular legs, without any need to use angled legs.

(D) The locking ring can be lowered into position without the legs requiring to be touched. The bearings for the legs retain them securely in the collapsed position. By varying the height of the locking ring, it is also possible to adjust the angle of the legs simply and effectively.

(E) The locking ring and the design of the leg attachment provide low-cost production and simple handling, and a stand of the intended kind can cope with a considerable incline. When passing through a doorway, for example, the legs can be folded down rapidly so that the stand is narrow, enabling one to pass through the door in only a matter of seconds.

The invention is described below as a preferred illustrative embodiment, in conjunction with which reference is made to the drawings, in which.

Figure 1:
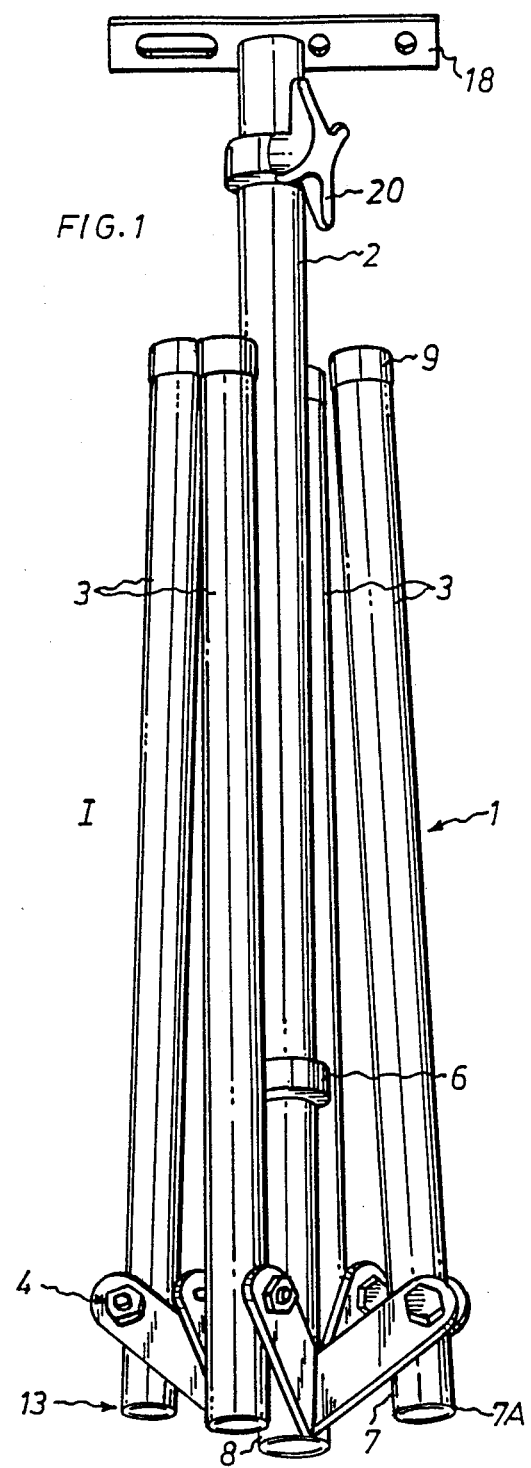
FIG. 1 shows a perspective view of a stand in accordance with the present invention in the collapsed, so-called "stowage position"
Figure 2:
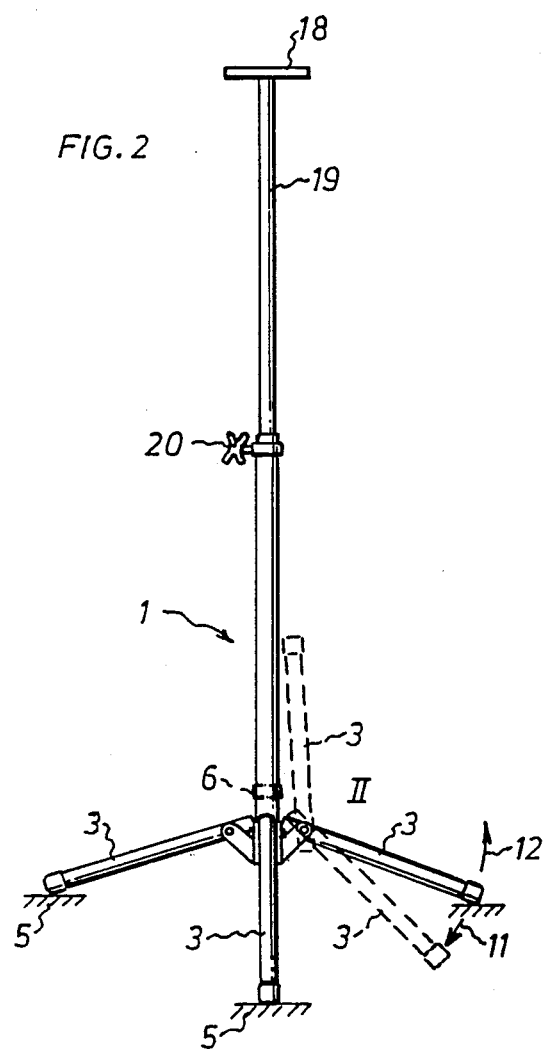
FIG. 2 shows the stand in the unfolded, supporting position.
Figure 3:
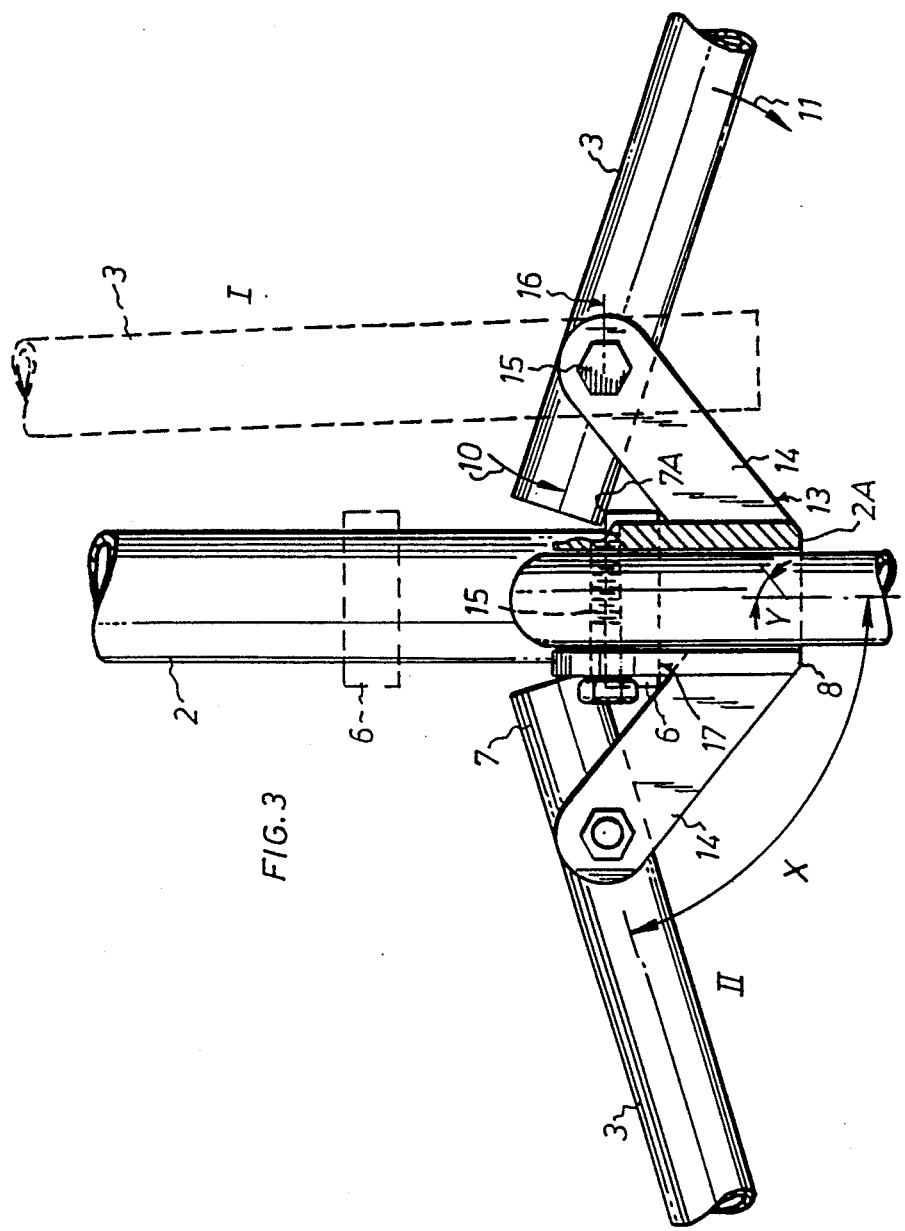
FIG. 3 shows a side view of the stand, with the supporting legs and the locking means represented as solid lines in the supporting position, and as broken lines in the stowage position.
Figure 4:
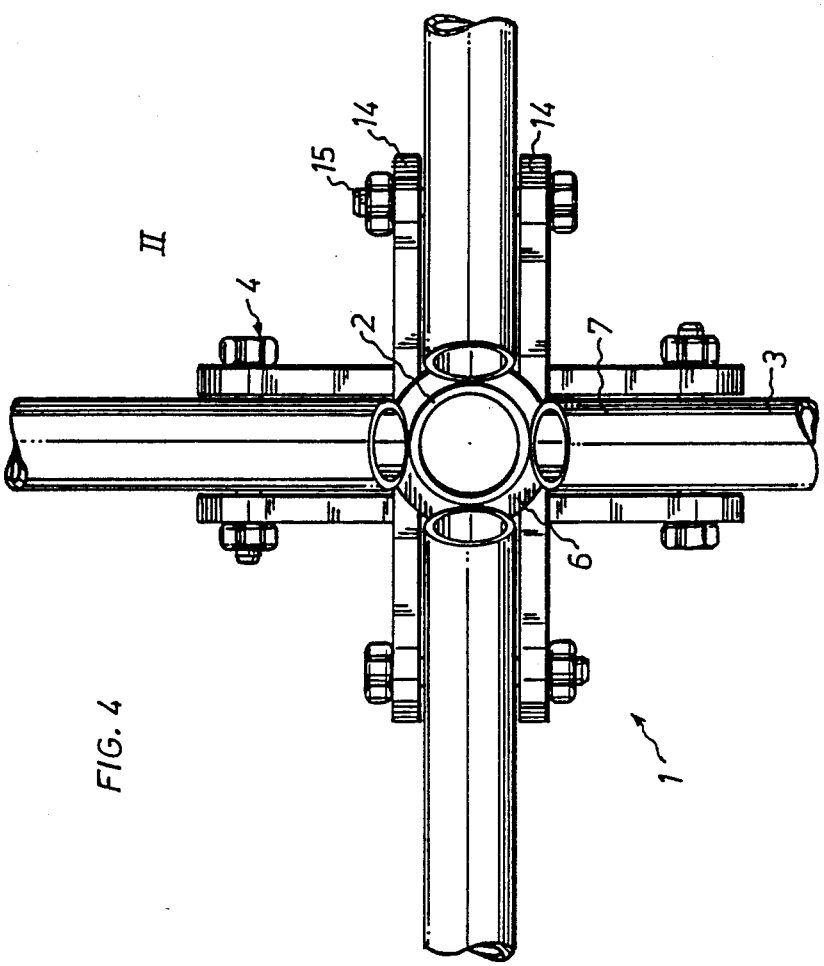
FIG. 4 shows a view from above of the lower part of the stand.

A stand 1 in accordance with the present invention comprises a central supporting upright 2, preferably in the form of a tube made of metal, plastic or some other suitable material, and distributed around same a number of preferably tubular supporting legs 3 made of a corresponding material, which supporting legs are attached to the central supporting upright 2 by means of bearings 4 which are capable of pivoting between the collapsed, so-called "stowage position", which position I is represented in FIG. 1, and the unfolded, so-called "supporting position", which position II is represented in FIGS. 2–4. In the stowage position I the supporting legs 3 are so arranged as to extend essentially along said central supporting upright 2, preferably parallel with and displaced laterally from same, and in the supporting position II the supporting legs 3 are so arranged as to extend at an angle X outwards from the central supporting upright 2 for the purpose of erecting the frame 1 on a base 5. Also present is a locking means 6, which consists appropriately of a ring passed onto the central supporting upright 2, and preferably capable of moving freely along it in its longitudinal sense, in order to permit the legs 3 to be locked in the unfolded supporting position II.

The locking means 6 for the legs is so arranged, when in the supporting position II, as to rest against the underside 7A or some other suitable part of those ends 7 of the supporting legs 2 which are situated closest to the central supporting upright 2. The locking means 6 is free to move along the central supporting upright 2 between a "stowage position" I in which it is maintained at a certain distance from the bearings 4 of the supporting legs, which in the illustrated example means that the locking ring 6 is capable of being displaced freely from a securing part 8 intended for the attachment of the leg bearings to the central supporting upright 2 and into the vicinity of the feet 9 of the supporting legs, and a "supporting position" II in which it is maintained at a certain distance from the bearings 4 of the supporting legs, in which position the locking ring 6 is situated between a stop constituted preferably by the leg attachment part 8 and the ends 7 of the supporting legs. The locking ring 6 is thus supported by the stop 8, which bears against the ends 7 of the supporting legs and prevents their continued downward pivoting movement in the direction of the arrow 10 towards a base 5 in the supporting position II referred to.

Only once the legs 3 have been folded down in the direction of the arrow 11 from their aforementioned unfolded position in the supporting position II can the stop ring 6 be freely displaced in the direction of the arrow upwards from said stop 8 and past the ends 7 of the supporting legs, whereupon the supporting legs 3, at the same time as the stop ring 6 is maintained in said released position, can be pivoted upwards in the direction of the arrow 12 closely along the central supporting upright 2, as represented by a broken line in FIGS. 2 and 3, and into the stowage position I.

The leg attachment part 8 consists of a section of a leg bearing support part 13, which comprises bearing lugs 14 projecting at an angle Y from the central supporting upright, which lugs are so arranged as to interact in pairs for the purpose of supporting bearing shafts 15 extending between the bearing lugs 14, which shafts are accommodated in appropriate holes through the legs 3, in order that the legs 3 shall be capable of being pivoted about same. The bearing lugs 14 appropriately extend at an acute angle Y in relation to the central supporting upright 2, so that they project in a direction obliquely upwards.

The bearing shafts 15 for the supporting legs 3 are also preferably situated at a level 16, viewed in the vertical sense of the stand, which is above the level 17 of the supporting position for said leg locking means.

In the illustrative embodiment presented here four supporting legs 3 are supported by the central supporting upright 2 at one end 2A of the upright and are evenly distributed around the periphery of the upright, although a different number of legs can, of course, be specified if required.

In order for them to be capable of being handled in the manner indicated above, however, the supporting legs 3 should be pivotally mounted so that each can be pivoted through at least 180° when the locking means 6 is displaced for a certain distance from its aforementioned locked position II.

The stand 1 can be used for a number of different purposes and may, for example, be so arranged as to be capable of supporting a lamp on a bracket 18. A supporting rod 19, which is capable of being connected to the central supporting upright 2 of the stand, is telescopically mounted on said central supporting upright 2 and is adjustable vertically relative to the central supporting upright 2 and is lockable in the position to which it has been adjusted, for example by means of a locking screw capable of being actuated by a knob 19.

The function should have emerged clearly from the foregoing and from what is shown in the drawings.

The invention is not, however, restricted to what is stated in the Claims and represented in the drawings, but may be varied within the context of the Patent Claims without departing from the idea of invention.

I claim:

1. A stand comprising a central supporting upright and supporting legs distributed around same, which supporting legs are mounted on the central supporting upright by bearings in such a way as to be capable of being pivoted between a collapsed stowage position and an unfolded supporting position, with the supporting legs extending essentially along said central upright and at an angle outwards from the central upright for the purpose of erecting the stand on a base, with a lock being provided for locking the legs in the unfolded supporting position, characterized in that a movable leg locking ring is passed onto the central supporting upright in its longitudinal sense and is retained between a stowage position in which it is maintained at a certain distance from the bearings of the supporting legs and a supporting position in which it is maintained at the bearings of the supporting legs, that pivot bearing shafts for the supporting legs are situated on a level above the level for the supporting position of said leg locking ring, and the locking ring is so arranged as to be capable of being accommodated in such a way as to rest against the upper portion of a section of the leg bearing supporting part attached to the central supporting upright, with the supporting legs capable of pivoting freely downwards from its unfolded supporting position when the locking ring is resting against the supporting part for the leg bearing, and with the ends of the supporting legs closest to the central upright resting against the upper side of said locking ring.

2. Stand according to claim 1, characterized in that the supporting legs in the stowage position extend essentially parallel with the central supporting upright and displaced laterally from it, and are fully pivotable in position when the locking means is arranged at a certain distance from its aforementioned locked position.

3. Stand according to claim 1, characterized in that the upper portion of the leg bearing of the supporting legs is arranged to receive the leg locking ring in said supporting position.

4. Stand according to claim 3, characterized in that upper portions of sideways from the leg supporting part extending leg bearing legs are aimed to receive said locking ring in said supporting position.

5. Stand according to claim 1, characterized in that the upper portion of a ring-formed leg bearing is aimed to receive said leg locking ring in said supporting position.

6. Stand according to claim 5, characterized in that said ring-formed leg bearing is countersunk down from sideways extending leg supporting legs.

7. Stand according to claim 1, characterized in that four supporting legs are carried by the central supporting upright at one of its ends and are evenly distributed around the periphery of the upright and the supporting legs are pivotally supported by bearing lugs to interact in pairs, with bearing shafts extending between the bearing lugs for supporting the respective supporting legs.

8. Stand according to claim 7, characterized in that the legs extend upwards at an acute angle (Y) in relation to the central supporting upright.

9. Stand according to claim 8, characterized in that the supporting legs are mounted for pivotable movement through at least 180°.

* * * * *